United States Patent

Linha

[11] 3,968,585
[45] July 13, 1976

[54] DEVICE FOR OPENING LEADER SNAPS

[75] Inventor: Jaromir B. Linha, Minot, N. Dak.

[73] Assignee: The Raymond Lee Organization, Inc., New York, N.Y. ; a part interest

[22] Filed: Mar. 12, 1975

[21] Appl. No.: 557,810

[52] U.S. Cl. .................................................. 43/4
[51] Int. Cl.² ........................................ A01K 97/00
[58] Field of Search ....................... 43/1, 4; 294/25; 81/177 C; 30/298

[56] References Cited
UNITED STATES PATENTS

| | | | |
|---|---|---|---|
| 666,666 | 1/1901 | Hackett | 294/25 |
| 2,151,846 | 3/1939 | Greneker | 294/25 |

FOREIGN PATENTS OR APPLICATIONS

| | | | |
|---|---|---|---|
| 375,249 | 3/1964 | Switzerland | 30/298 |

Primary Examiner—Warner H. Camp
Attorney, Agent, or Firm—Daniel Jay Tick

[57] ABSTRACT

A thimble-like member worn on the thumb of the hand of a fisherman has a wedge-like member approximating a finger nail extending therefrom. The wedge-like member has spaced notches formed therein and extending from the edge thereof to receive and manipulate the resilient wire member of a leader snap.

3 Claims, 8 Drawing Figures

DEVICE FOR OPENING LEADER SNAPS

DESCRIPTION OF THE INVENTION

The present invention relates to a device for opening leader snaps.

Objects of the invention are to provide a device for opening leader snaps of simple structure, which is inexpensive in manufacture, utilized with facility, convenience and ease, and functions efficiently, effectively and reliably to open leader snaps.

In order that the invention may be readily carried into effect, it will now be described with reference to the accompanying drawing, wherein.

In the FIGS., the same components are identified by the same reference numerals.

Figure 3:
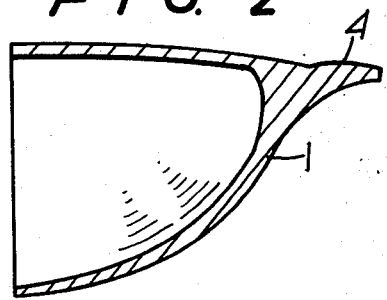
FIG. 3 is a cross-sectional view of the embodiment of FIG. 1.
Figure 4:
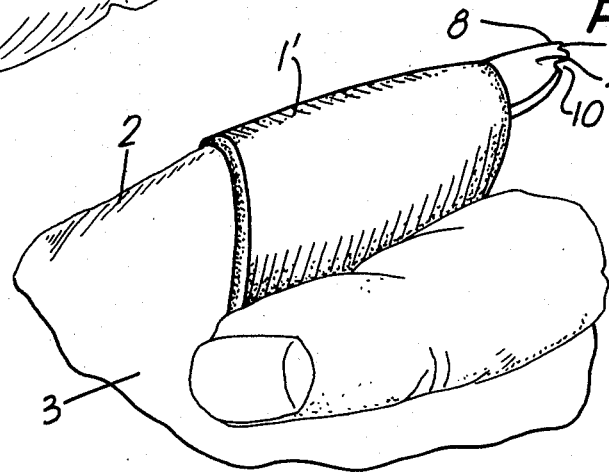
FIG. 4 is a perspective view of another embodiment of the device of the invention for opening leader snaps.
Figure 5:
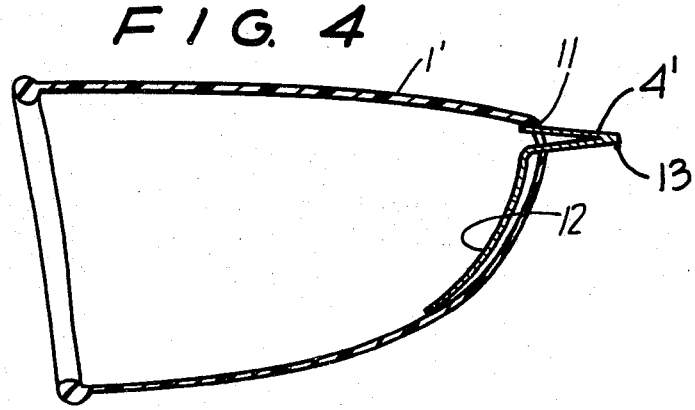
FIG. 5 is a cross-sectional view of the embodiment of FIG. 4.

The device of the invention is for opening leader snaps and comprises a substantially thimble-like member 1 (FIGS. 1 to 3) or 1' (FIGS. 4 and 5). The thimble-like member 1 or 1' is worn on the thumb 2 of a hand 3 of a fisherman and has a wedge-like member 4 (FIGS. 1 to 3) or 4' (FIGS. 4 and 5) approximating a finger nail extending therefrom. The wedge-like member 4 or 4' has spaced notches 5, 6 and 7 or 8, 9 and 10 formed therein and extending from the edge thereof (FIGS. 2 and 4).

Figure 1:
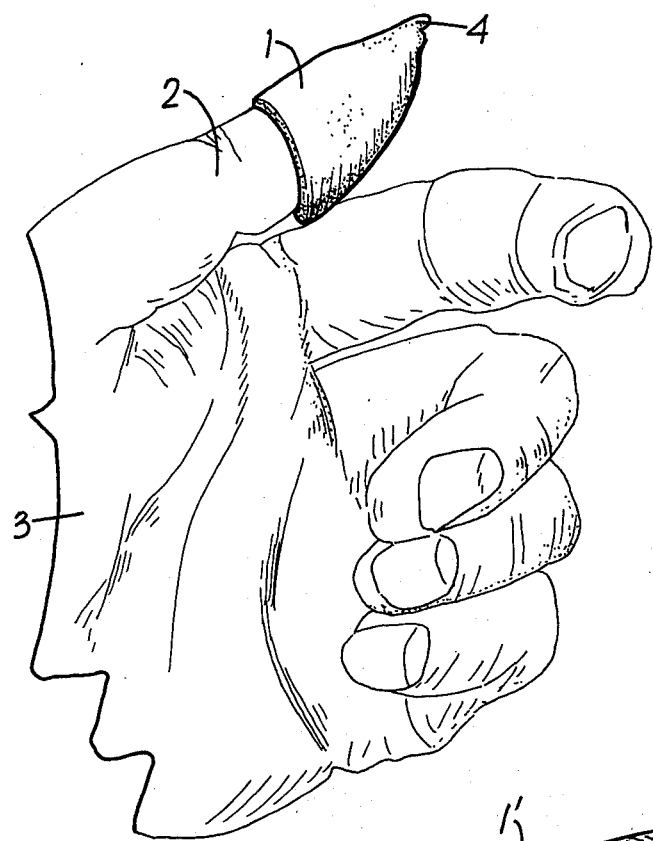
FIG. 1 is a perspective view of an embodiment of the device of the invention for opening leader snaps worn on the thumb of a user.
Figure 2:
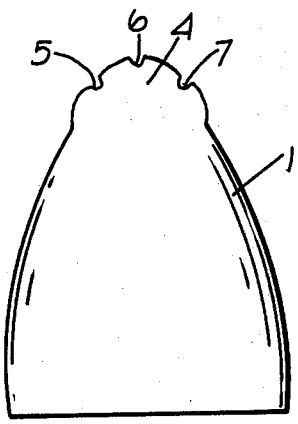
FIG. 2 is a view of the embodiment of FIG. 1.

In the embodiment of FIGS. 1 to 3, the wedge-like member 4 is integrally formed with the thimble-like member 1.

In the embodiment of FIGS. 4 and 5, the thimble-like member 1' has a slot 11 formed therethrough. The wedge-like member 4' has a support part 12 housed in the thimble-like member 1' and a wedge part 13 extending out of said thimble-like member to the outside via the slot 11.

The member 4 is wedge-like so that it will have a fine edge for opening leader snaps, and it has notches formed therein to keep said member from slipping off a leader snap in use.

Figure 6:
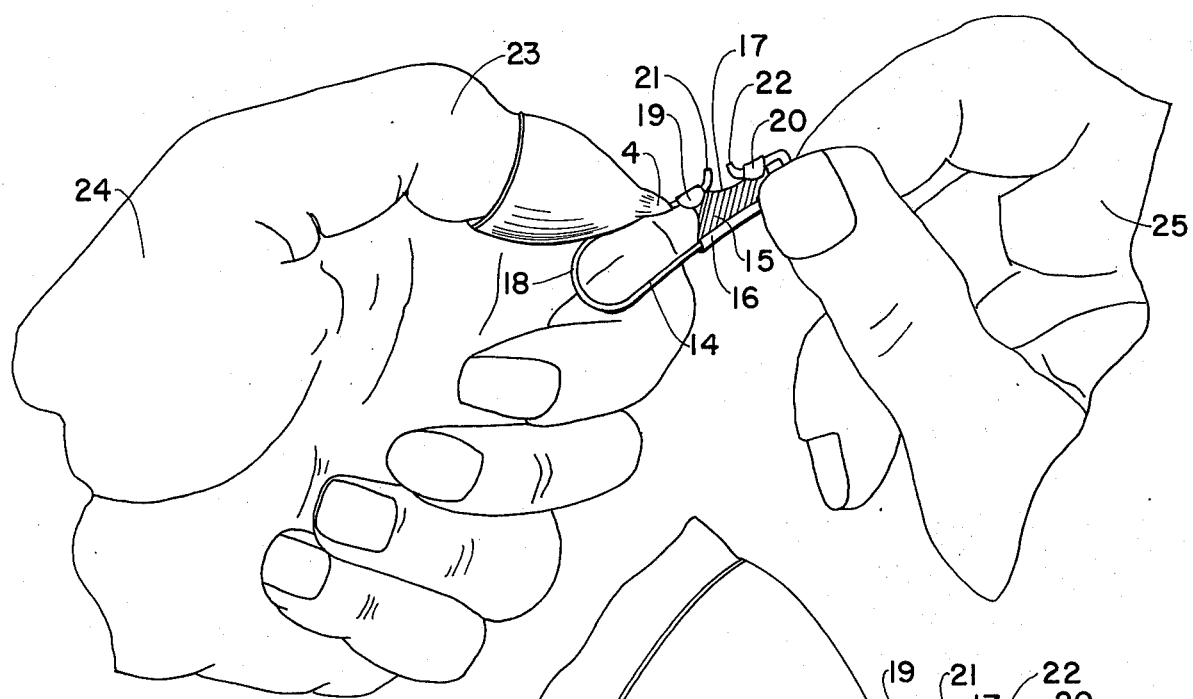
FIGS. 6, 7 and 8 illustrate the use of the device of the invention in opening a leader snap.
Figure 7:
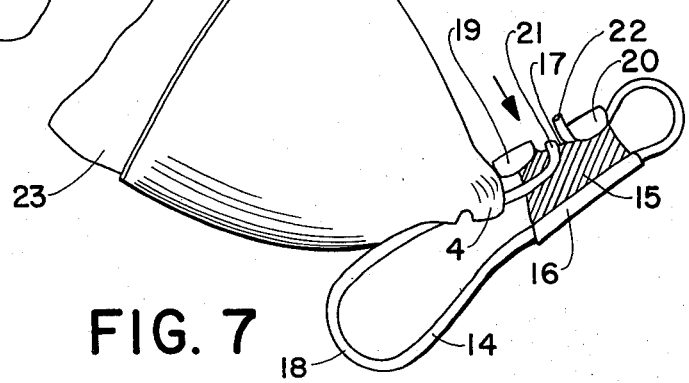
Figure 8:
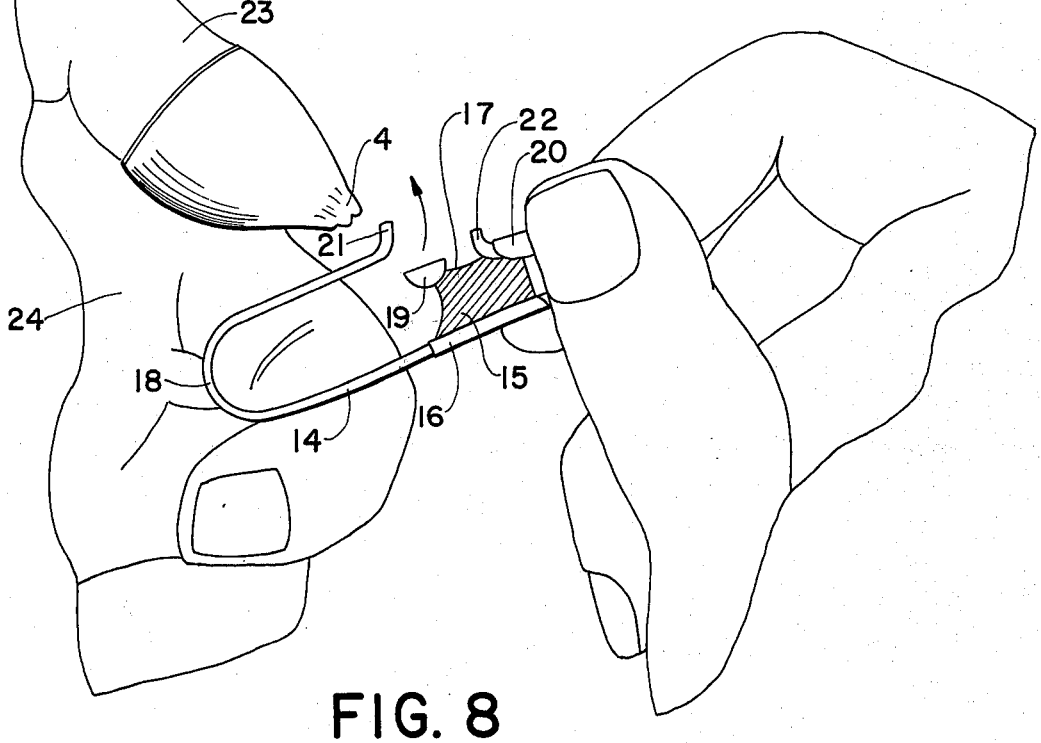

The device of the invention is used to open a leader snap 14 which consists of a device similar to a double-headed safety pin, as shown in FIGS. 6, 7 and 8. The leader snap 14 consists of a piece of material 15 such as plastic, metal, or the like, having spaced opposite first and second edges 16 and 17, respectively. The material is rolled over on itself along the first edge and supports a spring-like wire member 18 therein. The second edge 17 has a pair of spaced substantially parallel strips 19 and 20 extending therefrom, each rolled over on itself to form a catch.

The wire member 18 extends beyond both ends of the first edge 16 of the piece of material 15 and is bent over at a distance from each end of said first edge to form an open loop. The wire member has a pair of free ends 21 and 22, respectively, spaced from each other by a small gap. The wire member 18 is resiliently maintained in the piece of material 15 by the spring action of said wire member. One free end 21 of the wire member 18 is urged by spring force into constant engagement with the first rolled over strip 19 of the second edge 17 of the piece of material 15 and the other free end 22 of said wire member is urged by spring force into constant engagement with the second rolled over strip 20 of said second edge.

The device of the invention is used by placing it on the thumb 23 of a hand 24 of a user. The user holds the leader snap with one hand 25 and with the device on the thumb 23 of the other hand 24 presses the wire member 18 toward the first edge 16 of the piece of material 15 and away from the catch 19 housing it, thereby releasing the wire member from the catch. This is accomplished by clasping the wire member 18 in a notch in the member 4 of applicant's device and pushing toward the first edge 16 of the piece of material 15.

After the wire material 18 is released from its catch 19, its resilient action moves it beyond said catch farther from the first edge 16 of the piece, as shown in FIG. 8.

While the invention has been described by means of specific examples and in specific embodiments, I do not wish to be limited thereto, for obvious modifications will occur to those skilled in the art without departing from the spirit and scope of the invention.

I claim:

1. A device for opening leader snaps having a resilient wire element, said device comprising
a substantially thimble-like member worn on the thumb of a hand of a fisherman and having a wedge-like member approximating a fingernail extending therefrom, said wedge-like member having spaced notches formed therein and extending from the edge thereof, said notches being sized and shaped to receive and manipulate said resilient wire element.

2. A device for opening leader snaps as claimed in claim 1, wherein the wedge-like member is integrally formed with the thimble-like member.

3. A device for opening leader snaps as claimed in claim 1, wherein the thimble-like member has a slot formed therethrough and the wedge-like member has a support part housed in the thimble-like member and a wedge part extending out of the thimble-like member to the outside via the slot.

* * * * *